Oct. 25, 1960 G. A. LYON 2,957,413
BOMB HEAD CONSTRUCTION
Filed April 4, 1955
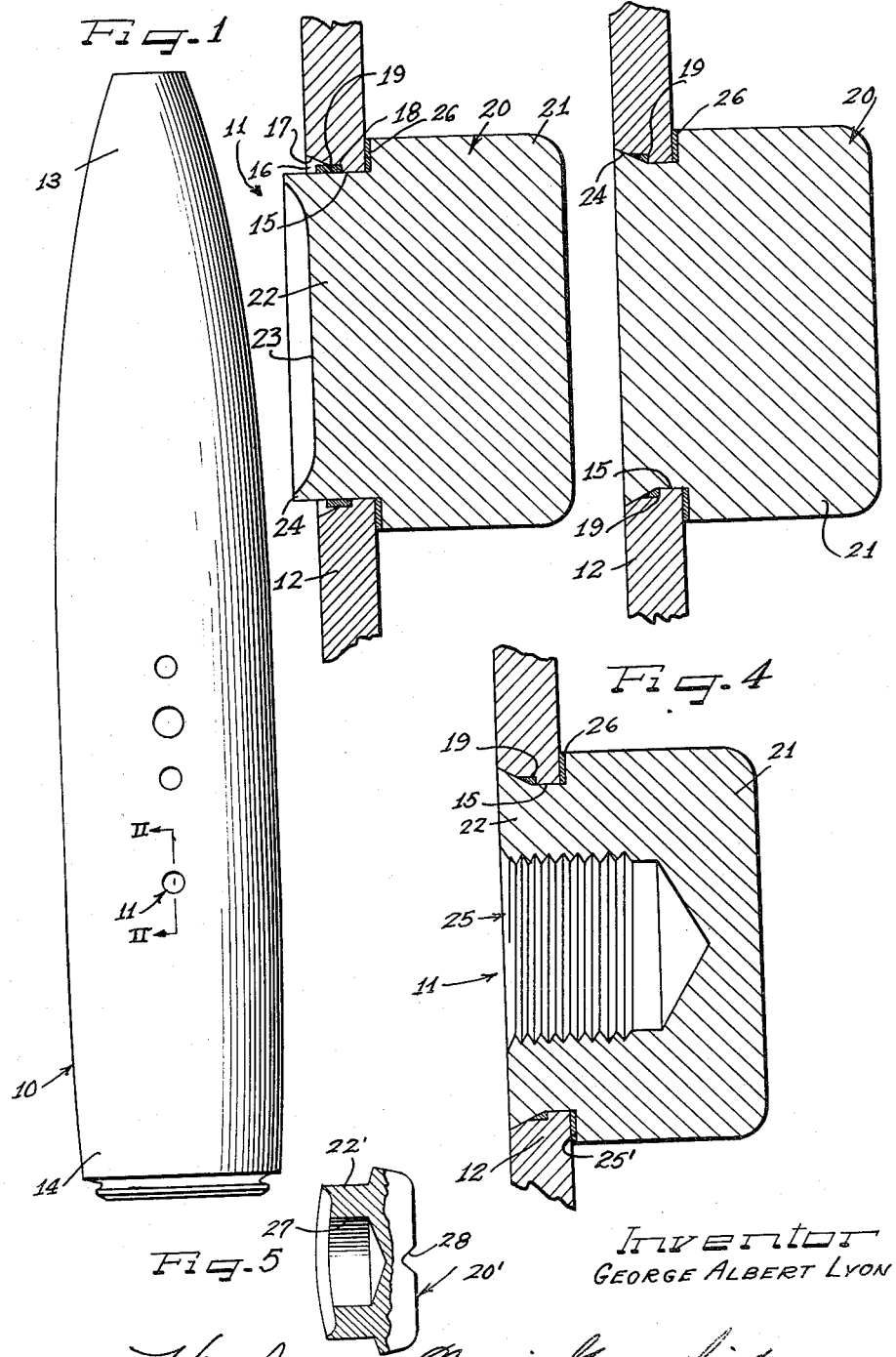
Inventor
GEORGE ALBERT LYON United States Patent Office 2,957,413
Patented Oct. 25, 1960

2,957,413
BOMB HEAD CONSTRUCTION
George Albert Lyon, 13881 W. Chicago Blvd., Detroit, Mich.
Filed Apr. 4, 1955, Ser. No. 498,957
3 Claims. (Cl. 102—2)

This invention relates to a socket structure by means of which a bomb may be hung or suspended from the underside of an air vehicle and more particularly to a stud type socket and method of manufacturing same.

One of the principal problems facing bomb manufacturers is in the provision of a bomb structure which will not have a tendency to leak so as to permit moisture to dampen the powder charge when the bomb is in storage pending use. In the past one of the most troublesome areas in bomb leakage has been in the vicinity of the bomb hanger socket.

It is an object of this invention to provide a simple but inexpensive way of attaching drop ring or bomb hanger sockets to a bomb casing.

Another object of this invention is to provide a fool proof connection between a bomb hanger and the wall of the casing.

A further object of this invention is in the provision of sealing means which completely seals the juncture of the stud to the wall of the casing.

A still further object of this invention is in the provision of a preformed stud which has been shaped to predetermined dimensions in order to facilitate its attachment with the bomb casing.

In accordance with the general features of this invention, there is provided in a bomb hanger stud assembly including a cylindrical casing wall with a countersunk opening, a stud inserted in the opening of the wall portion with its head at the inner side of the casing and its shank projecting outwardly, the terminal and outer end of the stud being riveted into a countersunk end of the opening and secured in place flush with the outer cylindrical surface of the casing and a ring of solder about said shank portion in the countersunk end of the aperture for sealing the stud to the casing.

In accordance with other features of this invention, there is provided in a method of securing and sealing a hanger stud on a bomb casing, the steps of aligning and telescoping a shank portion of the stud within an opening provided in the bomb casing, positioning a silver solder ring about the shank, riveting the radially outer terminal end of the shank to the casing and stress relieving the assembly while contemporaneously melting the silver solder thereby sealing the juncture of the casing and the stud.

Other objects and features of this invention may fully appear from the following detailed description taken in connection with the accompanying drawings which illustrate a single embodiment thereof and in which:

Figure 1 is a side view of a bomb having a series of hanger socket studs for suspending the bomb from the trate a single embodiment thereof and in which:

Figure 2 is a fragmentary sectional view taken on the line II—II of Figure 1 looking in the direction indicated by the arrows and showing the shank of the stud extending through the bomb wall prior to the securing of the shank to the wall and the drilling of the socket in the stud;

Figure 3 is a fragmentary view very similar to Figure 2 showing the stud riveted to the bomb wall;

Figure 4 is a fragmentary sectional view similar to Figures 3 and 4 showing the completed socket after it has been drilled and tapped; and Figure 5 is a cross sectional view partly in elevation of a modified form of stud.

As shown on the drawings:

The reference numeral 10 designates generally a cylindrical bomb shell or casing having a series of hanger stud sockets 11 embodying the features of this invention and which are secured to the cylindrical wall 12 of the bomb.

Since my invention will be best understood from a detailed description made in conjunction with the steps of my novel method I shall now relate in detail the steps of my novel method.

The first step in my novel method of construction of the instant streamlined low drag type bomb casing or body 10 (Figure 1) is the drawing and forming of the generally tubular bomb casing from rolled steel plate such as high carbon steel or the like into a tubular section nosed at one extremity 13 and headed at the other extremity 14. It will be appreciated that this may be effected in any suitable manner, and that the casing may be constructed of two or more sections if desired.

The next step of my novel method is in the formation of an aperture or opening 15 in the wall 12 of the casing 10 (Figs. 2–4). It will be noted that one end of the aperture 15 is countersunk at 16 to form an outwardly inclined surface 17 at the outer side of the bomb casing. The inclined surface 17 has formed therein an annular indentation 18 which is adapted to receive a solder ring 19 such as silver solder or the like.

The next step in my novel method is in the formation of a stud 20, a shank portion of which is adapted to telescope within the aperture 15 and to thereafter be secured in place as hereinafter described. The stud 20 is comprised of a headed portion 21, and a reduced shank portion 22. The shank portion 22 is irregularly dished at one end in a predetermined manner at 23 and terminates in an irregularly configurated annular lip or edge 24. It will be appreciated that the irregular shape imparted to the dished portion 23 and the edge 24 enables the dished end to be conformed to and aligned with the outer cylindrical surface of the casing.

After the formation of the aperture or opening 15 in the bomb casing 10 the respective elements are then in condition to be assembled. In assembling the component elements the shank portion 22 is telescoped through the aperture 15 with the headed portion 21 having an annular irregularly configurated shoulder 25' bearing against the radially inner cylindrical surface of the casing wall 12. Positioned on the shoulder 25' is an irregularly configurated annular sealing ring or gasket 26 which may be made of copper or other suitable material, the gasket 26 in addition to serving as a seal also because of its inherent soft metal characteristic assists in correcting any slight misalignment of the stud during the assembly operation now being described.

After the shank portion 22 has been positioned in the aperture 15 and the shoulder 25' has been brought into abutment with the radially inner surface of wall 12, an annular solder ring 19 is inserted in the indentation 18 provided therefor.

By the use of a suitable apparatus the terminal annular lip or edge 24 is interlocked or riveted against the inclined annular surface 17 of wall 12. It is in this manner that the stud 20 is firmly secured to the wall 12 of the casing 10. It will be noted in Figure 4 that the outer terminal end of the shank portion 22 is concentric or flush with the outer surface of the casing 10 thereby maintaining the streamlined characteristics of the instant bomb construction.

The next step of my invention concerns itself with the drilling and tapping of the stud as indicated generally at 25 (Figure 4) so that it can receive a hanger element (not shown) for suspending the bomb from the underside of an air vehicle or the like.

In order to minimize the likelihood of the junction of the stud 20 with the wall 12 cracking or otherwise coming apart, the bomb shell assembly is stress relieved in a furnace (not shown) at a predetermined temperature. The stress relieving of the assembly is brought about by heating it to a temperature substantially above the melting point of solder thereby melting the solder and sealing the hanger stud with the bomb casing in moisture proof relation. It is in this manner that the silver solder ring 19 is liquidized and a capillary action set up so as to draw the silver solder into any unsealed crevasses or the like. Thus, not only is the metal about the shank portion 22 worked in the riveting operation and the like, but in addition it is stress relieved and provided with a solder which seals the junction of the wall and the stud 20.

Figure 5 illustrates a modified stud construction 20'. In this case the stud 20' is preformed with a hole 27 in the shank portion 22'. By forming the stud 20' with a hole 27 a tapered punch (not shown) may be inserted into same during the assembly operation to force the metal outward to insure a tight fit between the stud and the casing wall about the aperture 15.

The modified stud 20' has formed on the other end of same a V-shaped slot or notch 28. The V-shaped slot 28 on the bottom of the stud 20' serves to facilitate a proper alignment of the stud with the aperture 15 in the bomb wall in the assembly operation. It will be appreciated that the modified stud construction 20' is otherwise the same as previously described.

In view of the foregoing it will now be appreciated that when a stud insert is welded, as distinguished from being riveted as here, the metallurgical characteristics of the bomb wall must be taken into consideration due to the heat fusion, by welding, of the insert to the wall. In other words, the heat of welding may adversely affect the physical properties of the bomb wall or at least require subsequent heat treating operations. By riveting the stud to the bomb wall no substantial change is occasioned in the metallurgical or physical properties of the bomb wall.

The type of stud herein employed had been hydrostatically tested to 500 pounds per square inch without any signs of leakage. The requirements on the bomb applicant worked with required a hydrostatic test of 100 pounds per square inch without leakage. The stud was also subjected to a 2500 pound load on the same trying to push the stud through the side of the bomb wall. The tests on the stud showed that there was not the slightest evidence of distortion even .001 of an inch.

While the steps of my novel method have been described generally in chronological order it will be appreciated that certain of the steps may be interchanged without departing from the instant invention.

It will be understood that modifications and variations may be effected without departing from the spirit and scope of the novel concepts of my present invention.

I claim as my invention:

1. In a bomb hanger stud assembly including a tubular bomb casing wall having curved inner and outer casing surfaces with a counter-sunk opening therethrough, said stud comprising a shank having a dished terminal at one end defining an annular flange and having a headed portion at another end including an annular curved shoulder surface configurated to match the inner casing surface, said shank portion of said stud being telescoped through said hole with the headed portion shouldered against the bomb casing with the curved shoulder surface interlockingly bottomed against the inner casing surface and with said annular flange extending beyond said casing wall, solder between said countersunk opening and said shank portion, said annular flange of the dished terminal extending away from the shank and disposed in said countersunk opening overlying said solder and in flush interlocked engagement with the outer curved surface of said casing wall, and a threaded stud socket area provided on the stud at the outer side of the casing wall which area opens only externally of the casing to prevent moisture seepage through the stud.

2. In a method of forming a curved cylindrical bomb casing wall and providing it with a moisture-proof bomb hanger stud socket structure which is flush with the outer curved surface of the bomb casing wall, the steps of suitably forming a tubular curved cylindrical bomb casing such as by a drawing operation and the like, nosing one end of the casing, punching a counter sunk hole through the curved drawn casing wall on the casing with the counter sunk portion of the hole disposed at the area of the outer curved surface of the bomb casing wall, preforming a hanger stud element with the stud having a curved shoulder structure with a configuration matching that of the inner curved surface of the cylindrical bomb casing wall and forming and dishing a reduced shank end of the hanger stud, the shank being extended away from the curved shoulder structure a dimension in excess of the thickness of the curved bomb casing wall, positioning a sealing gasket structure on the shoulder structure of the hanger stud, telescoping the shank from the inside of the curved bomb casing wall through the counter sunk opening bottoming the sealing gasket and the curved shoulder structure flush against the curved inner surface of the bomb casing wall, in interlocked engagement therewith, pressing and turning the shank lip extending externally of the bomb casing into the counter sunk opening flush with the outer curved surface leaving the stud at its outer end flush with the outer curved surface of the bomb casing wall, stress relieving the assembly by heating to a temperature substantially above the melting point of solder thereby melting the solder and sealing the hanger stud with the bomb casing wall in moisture proof relation, and drilling and tapping the hanger stud for receipt of a hanger element.

3. In a method of forming a curved cylindrical bomb casing wall and providing it with a moisture-proof bomb hanger stud socket structure which is flush with the outer curved surface of the bomb casing wall, the steps of suitably forming a tubular curved cylindrical bomb casing such as by a drawing operation and the like, nosing one end of the casing, punching a counter sunk hole through the curved drawn casing wall on the casing with the counter sunk portion of the hole disposed at the area of the outer curved surface of the bomb casing wall, preforming a hanger stud element with the stud having a curved shoulder structure with a configuration matching that of the inner curved surface of the cylindrical bomb casing wall and forming and dishing a reduced shank end of the hanger stud, the shank being extended away from the curved shoulder structure a dimension in excess of the thickness of the curved bomb casing wall, telescoping the shank from the inside of the curved bomb casing wall through the counter sunk opening bottoming the curved shoulder structure flush against the curved inner surface of the bomb casing wall, in interlocked engagement therewith, pressing and turning the shank lip extending externally of the bomb casing into the counter sunk opening flush with the outer curved surface leaving the stud at its outer end flush with the outer curved surface of the bomb casing wall, drilling and tapping the hanger stud for receipt of a hanger element and stress relieving the assembly by heating to a temperature substantially above the melting point of solder thereby melting the solder and sealing the hanger stud with the bomb casing wall in moisture proof relation.

References Cited in the file of this patent

UNITED STATES PATENTS

| | | |
|---|---|---|
| 1,034,805 | Lachman | Aug. 6, 1912 |
| 1,180,812 | Wolf | Apr. 25, 1916 |
| 1,420,721 | McNiff | June 27, 1922 |
| 1,718,610 | Strama | June 25, 1929 |
| 1,857,912 | Jones | May 10, 1932 |
| 1,883,906 | Hasselquist | Oct. 25, 1932 |
| 2,302,505 | Rayniak | Nov. 17, 1942 |
| 2,440,298 | Ronay et al. | Apr. 27, 1948 |
| 2,779,998 | Bailey | Feb. 5, 1957 |